United States Patent
Koskinen et al.

(10) Patent No.: US 10,694,448 B2
(45) Date of Patent: *Jun. 23, 2020

(54) METHOD AND APPARATUS FOR IMPLEMENTING ACCESS CONTROL

(71) Applicant: NOKIA SOLUTIONS AND NETWORKS OY, Espoo (FI)

(72) Inventors: Jussi-Pekka Koskinen, Oulu (FI); Jarkko Tuomo Koskela, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,092

(22) Filed: Jan. 31, 2019

(65) Prior Publication Data

US 2019/0166546 A1    May 30, 2019

Related U.S. Application Data

(63) Continuation of application No. 14/935,099, filed on Nov. 6, 2015, now Pat. No. 10,383,036.

(51) Int. Cl.
*H04W 48/10* (2009.01)
*H04W 24/02* (2009.01)
(Continued)

(52) U.S. Cl.
CPC ........... *H04W 48/10* (2013.01); *H04W 24/02* (2013.01); *H04W 48/02* (2013.01); *H04W 4/70* (2018.02); *H04W 24/10* (2013.01); *H04W 48/08* (2013.01)

(58) Field of Classification Search
CPC .............................. H04W 48/10; H04W 24/02
See application file for complete search history.

(56) References Cited

U.S. PATENT DOCUMENTS

2006/0217115 A1    9/2006    Cassett
2006/0262752 A1*   11/2006   Moore ................. H04L 63/102
                                                    370/331
(Continued)

FOREIGN PATENT DOCUMENTS

EP    2 765 822 A2    8/2014
GB    2506150 A       3/2014
(Continued)

OTHER PUBLICATIONS

3GPP TSG-RAN2 Meeting #91bis; R-154720; "Principles for NB-IoT; Geran Agreed Operator Requirements on Network Sharing, Cell Barring and Access Control", Deutsche Telekom; Oct. 5-9, 2015, 4 pages.
(Continued)

*Primary Examiner* — Samina F Choudhry
(74) *Attorney, Agent, or Firm* — Squire Patton Boggs (US) LLP

(57) ABSTRACT

A method and apparatus may include determining at least one access control criterion for a communication device. Meeting the at least one access control criterion depends on actions of the communication device. The method may also include transmitting the at least one access control criterion to the communication device. The at least one access control criterion enables the communication device to determine whether the communication device is allowed to access a network.

18 Claims, 6 Drawing Sheets

```
AC-BarringPerPLMN-List-r13 ::=      SEQUENCE (SIZE (1..maxPLMN-r11))
  OF AC-BarringPerPLMN-r13

AC-BarringPerPLMN-r13 ::=           SEQUENCE {
    plmn-IdentityIndex-r13              INTEGER (1..maxPLMN-r11),
    ac-BarringPerCE                     SEQUENCE (SIZE (1..
maxCEs-r13)) OF AC-BarringInfo
    }                                                       OPTIONAL,   --
Need OP
}

AC-BarringInfo ::=   SEQUENCE   {
   ac-BarringForNormal-r13        AC-BarringConfig OPTIONAL,   -- Need OP
   ac-BarringForExceptional-r13   AC-BarringConfig OPTIONAL,   -- Need OP
}
```

(51) Int. Cl.
*H04W 48/02* (2009.01)
*H04W 24/10* (2009.01)
*H04W 48/08* (2009.01)
*H04W 4/70* (2018.01)

(56) References Cited

U.S. PATENT DOCUMENTS

| | | |
|---|---|---|
| 2008/0045213 A1 | 2/2008 | Norris |
| 2008/0056125 A1 | 3/2008 | Kneckt |
| 2012/0083204 A1 | 4/2012 | Martin |
| 2012/0252453 A1 | 10/2012 | Nagaraja |
| 2013/0045706 A1 | 2/2013 | Hsu |
| 2013/0058244 A1 | 3/2013 | Huang |
| 2013/0227116 A1 | 8/2013 | Radhakrishnan |
| 2013/0308527 A1 | 11/2013 | Chin |
| 2013/0324107 A1 | 12/2013 | Lindoff |
| 2014/0099912 A1 | 4/2014 | Lee et al. |
| 2014/0169240 A1 | 6/2014 | Han |
| 2014/0334319 A1 | 11/2014 | Kubota |
| 2015/0227116 A1 | 8/2015 | Ronkainen |
| 2015/0359008 A1 | 12/2015 | Wang |
| 2017/0093540 A1 | 3/2017 | Lei |

FOREIGN PATENT DOCUMENTS

| | | |
|---|---|---|
| JP | 2014-520479 A | 8/2014 |
| WO | 2015/109983 A1 | 7/2015 |

OTHER PUBLICATIONS

3GPP TSG RAN WG1 Meeting #79; R1-144695; "Coverage Enhancement Targets", Alcatel-Lucent, Alcatel-Lucent Shanghai Bell; Nov. 17-21, 2014; 3 pages.
Japanese Office Action, Notification of Ground of Rejection application No. 2018-540220 dated Feb. 27, 2019.
3GPP TS 22.011 V14.0.0 (Sep. 2015); 3rd Generation Partnership Project; Technical Specification Group Services and System Aspects; Service accessibility (Release 14), pp. 1-28. No copy provided, per MPEP 609. Copy submitted in parent U.S. Appl. No. 14/935,099.
3GPP TS 36.300 V13.1.0 (Sep. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), pp. 1-254. No copy provided, per MPEP 609. Copy submitted in parent U.S. Appl. No. 14/935,099.
3GPP TS 36.304 V12.6.0 (Sep. 2015); 3rd Generation Partnership Project; Technical Specification Group Radio Access Network; Evolved Universal Terrestrial Radio Access (E-UTRA); User Equipment (UE) procedures in idle mode (Release 12), pp. 1-38. No copy provided, per MPEP 609. Copy submitted in parent U.S. Appl. No. 14/935,099.
3GPP TS 36.331 V12.7.0 (Sep. 2015); 3rd Generation Partnership Project; Technical Specification Group Radio Access Network; Evolved Universal Terrestrial Radio Access (E-UTRA); Radio Resource Control (RRC); Protocol specification (Release 12), pp. 1-453. No copy provided, per MPEP 609. Copy submitted in parent U.S. Appl. No. 14/935,099.
RP-151621; Qualcomm Incorporated; "New Work Item: NarrowBand IOT (NB-IOT)"; 3GPP TSG RAN Meeting #69; Phoenix, USA, Sep. 14-16, 2015, pp. 1-9. No copy provided, per MPEP 609. Copy submitted in parent U.S. Appl. No. 14/935,099.
Qualcomm Indorporated, "NB-IoT-Key Requirements", 3GPP TSG RAN WG2 #91 bis, R2-154726, Oct. 5-9, 2015, pp. 1-5. No copy provided, per MPEP 609. Copy submitted in parent U.S. Appl. No. 14/935,099.
Intel Corporation, "General L2/L3 Impacts due to Introduction of NB-IOT Feature", 3GPP TSG WG2 Meeting #91bis, R2-154833, Oct. 5-9, 2016, 4 pages. No copy provided, per MPEP 609. Copy submitted in parent U.S. Appl. No. 14/935,099.
Mediateck Inc., (Session Chair), "Report of the LTE Breakout Session (NB-IoT)", 3GPP TSG-RAN WG2 #92, 3GPP TSG RAN WG2 #91bis, R2-154893, Oct. 5-9, 2015, pp. 1-18. No copy provided, per MPEP 609. Copy submitted in parent U.S. Appl. No. 14/935,099.
Ericsson, "Access Control for NB-IoT" 3GPP TSG-RAN WG2 #92, R2-156136, Nov. 16-20, 2015, pp. 1-4. No copy provided, per MPEP 609. Copy submitted in parent U.S. Appl. No. 14/935,099.
International Search Report and Written Opinion corresponding to International Application No. PCT/FI2016/050669 dated Nov. 6, 2015. No copy provided, per MPEP 609. Copy submitted in parent U.S. Appl. No. 14/935,099.

* cited by examiner

```
AC-BarringPerPLMN-List-r13 ::=    SEQUENCE (SIZE (1..maxPLMN-r11))
    OF AC-BarringPerPLMN-r13

AC-BarringPerPLMN-r13 ::=    SEQUENCE {
    plmn-IdentityIndex-r13        INTEGER (1..maxPLMN-r11),
    ac-BarringPerCE               SEQUENCE (SIZE (1..
    maxCEs-r13)) OF AC-BarringInfo                          OPTIONAL,  --
    Need OP
}

AC-BarringInfo ::=    SEQUENCE {
    ac-BarringForNormal-r13       AC-BarringConfig OPTIONAL,  -- Need OP
    ac-BarringForExceptional-r13  AC-BarringConfig OPTIONAL,  -- Need OP
}
```

Fig. 1

METHOD AND APPARATUS FOR IMPLEMENTING ACCESS CONTROL

CROSS REFERENCE TO RELATED APPLICATION

The present application is a 37 C.F.R. § 1.53(b) continuation of co-pending U.S. patent application Ser. No. 14/935,099 filed Nov. 6, 2015. The entire content of all of the above referenced applications are hereby incorporated by reference.

BACKGROUND

Field

Certain embodiments of the present invention relate to implementing access control.

Description of the Related Art

Internet-of-Things (IOT) technology relates to networks of physical objects which are embedded with electronics, software, sensors, and/or network connectivity. IOT technology enables these objects to collect and exchange data. Since its inception, IOT technology has seen extensive deployment in a wide variety of contexts involving the communication of data.

SUMMARY

According to a first embodiment, a method may include determining, by a network node of a network, at least one access control criterion for a communication device. Meeting the at least one access control criterion depends on actions of the communication device. The method may also include transmitting the at least one access control criterion to the communication device. The at least one access control criterion enables the communication device to determine whether the communication device is allowed to access a network.

In the method of the first embodiment, the transmitting comprises transmitting by an evolved Node B to a user equipment.

In the method of the first embodiment, the at least one access control criterion indicates a type of reporting that can access the network.

In the method of the first embodiment, the type of reporting that can access the network comprises only exception reporting.

In the method of the first embodiment, exception reporting comprises high priority data.

In the method of the first embodiment, the type of reporting that can access the network comprises normal reporting.

In the method of the first embodiment, the at least one access control criterion indicates at least one coverage area where the communication device is required to locate in order to access the network.

In the method of the first embodiment, the at least one access control criterion indicates at least one coverage class which is allowed or not allowed to access the network.

In the method of the first embodiment, the at least one access control criterion indicates a received power threshold that is to be met in order to access the network.

In the method of the first embodiment, the at least one access control criterion indicates a received signal quality level that is to be met in order to access the network.

In the method of the first embodiment, the at least one access control criterion indicates a time that is required to have elapsed since last reporting by the communication device in order to access the network.

In the method of the first embodiment, the at least one access control criterion further indicates a subscription class that is required from a user subscription in order to access the network.

In the method of the first embodiment, the method may also include transmitting a plurality of the access control criteria.

In the method of the first embodiment, the transmitting may include transmitting via broadcast signaling.

In the method of the first embodiment, the transmitting may include transmitting via dedicated signaling.

According to a second embodiment, an apparatus may include at least one processor. The apparatus may also include at least one memory including computer program code. The at least one memory and the computer program code may be configured, with the at least one processor, to cause the apparatus at least to determine at least one control criterion for a communication device. Meeting the at least one access control criterion depends on actions of the communication device. The apparatus may also be caused to transmit the at least one access control criterion to the communication device. The at least one access control criterion enables the communication device to determine whether the communication device is allowed to access a network.

In the apparatus of the second embodiment, the transmitting comprises transmitting by an evolved Node B to a user equipment.

In the apparatus of the second embodiment, the at least one access control criterion indicates a type of reporting that can access the network.

In the apparatus of the second embodiment, the type of reporting that can access the network comprises only exception reporting.

In the apparatus of the second embodiment, exception reporting comprises high priority data.

In the apparatus of the second embodiment, the type of reporting that can access the network comprises normal reporting.

In the apparatus of the second embodiment, the at least one access control criterion indicates at least one coverage area where the communication device is required to locate in order to access the network.

In the apparatus of the second embodiment, the at least one access control criterion indicates at least one coverage class which is allowed or not allowed to access the network.

In the apparatus of the second embodiment, the at least one access control criterion indicates a received power threshold that is to be met in order to access the network.

In the apparatus of the second embodiment, the at least one access control criterion indicates a received signal quality level that is to be met in order to access the network.

In the apparatus of the second embodiment, the at least one access control criterion indicates a time that is required to have elapsed since last reporting by the communication device in order to access the network.

In the apparatus of the second embodiment, the at least one access control criterion further indicates a subscription class that is required from a user subscription in order to access the network.

In the apparatus of the second embodiment, the method may also include transmitting a plurality of the access control criteria.

In the apparatus of the second embodiment, the transmitting may include transmitting via broadcast signaling.

In the apparatus of the second embodiment, the transmitting may include transmitting via dedicated signaling.

According to a third embodiment, a computer program product may be embodied on a non-transitory computer readable medium. The computer program product may be configured to control a processor to perform a method according to the first embodiment.

According to a fourth embodiment, a method may include receiving, by a communication device, at least one access control criterion from a network node of a network. The method may also include determining a need to access the network. The method may also include determining whether the communication device is allowed to access the network based on whether the received at least one access control criterion is met or not, wherein meeting the at least one access control criterion depends on actions of the communication device.

In the method of the fourth embodiment, the receiving comprises receiving by a user equipment from an evolved Node B.

In the method of the fourth embodiment, the at least one access control criterion indicates a type of reporting that can access the network.

In the method of the fourth embodiment, the type of reporting that can access the network comprises only exception reporting.

In the method of the fourth embodiment, the exception reporting comprises high priority data.

In the method of the fourth embodiment, the type of reporting that can access the network comprises normal reporting.

In the method of the fourth embodiment, the at least one access control criterion indicates at least one coverage area where the communication device is required to locate in order to access the network.

In the method of the fourth embodiment, the at least one access control criterion indicates at least one coverage class which is allowed or not allowed to access the network.

In the method of the fourth embodiment, the at least one access control criterion indicates a received power threshold that is to be met in order to access the network.

In the method of the fourth embodiment, the at least one access control criterion indicates a received signal quality level that is to be met in order to access the network.

In the method of the fourth embodiment, the at least one access control criterion indicates a time that is required to have elapsed since last reporting by the communication device in order to access the network.

In the method of the fourth embodiment, the at least one access control criterion further indicates a subscription class that is required from a user subscription in order to access the network.

In the method of the fourth embodiment, the method may also include receiving a plurality of the access control criteria from the network node. The deciding of whether or not to initiate access to the network comprises considering all of the plurality of received access control criteria.

In the method of the fourth embodiment, the receiving comprises receiving via broadcast signaling.

In the method of the fourth embodiment, the receiving comprises receiving via dedicated signaling.

In the method of the fourth embodiment, the method may also include applying narrow-band Internet-of-Things communication for the access to the network.

According to a fifth embodiment, an apparatus may include at least one processor. The apparatus may also include at least one memory including computer program code. The at least one memory and the computer program code may be configured, with the at least one processor, to cause the apparatus at least to receive at least one access control criterion from a network node of a network. The apparatus may also be caused to determine a need to access the network. The apparatus may also be caused to determine whether the apparatus is allowed to access the network based on whether the received at least one access control criterion is met or not, wherein meeting the at least one access control criterion depends on actions of the apparatus.

In the apparatus of the fifth embodiment, the apparatus comprises a user equipment, and the network node comprises an evolved Node B.

In the apparatus of the fifth embodiment, the at least one access control criterion indicates a type of reporting that can access the network.

In the apparatus of the fifth embodiment, the type of reporting that can access the network comprises only exception reporting.

In the apparatus of the fifth embodiment, the exception reporting comprises high priority data.

In the apparatus of the fifth embodiment, the type of reporting that can access the network comprises normal reporting.

In the apparatus of the fifth embodiment, the at least one access control criterion indicates at least one coverage area where the communication device is required to locate in order to access the network.

In the apparatus of the fifth embodiment, the at least one access control criterion indicates at least one coverage class which is allowed or not allowed to access the network.

In the apparatus of the fifth embodiment, the at least one access control criterion indicates a received power threshold that is to be met in order to access the network.

In the apparatus of the fifth embodiment, the at least one access control criterion indicates a received signal quality level that is to be met in order to access the network.

In the apparatus of the fifth embodiment, the at least one access control criterion indicates a time that is required to have elapsed since last reporting by the communication device in order to access the network.

In the apparatus of the fifth embodiment, the at least one access control criterion further indicates a subscription class that is required from a user subscription in order to access the network.

In the apparatus of the fifth embodiment, the method may also include receiving a plurality of the access control criteria from the network node. The deciding of whether or not to initiate access to the network comprises considering all of the plurality of received access control criteria.

In the apparatus of the fifth embodiment, the receiving comprises receiving via broadcast signaling.

In the apparatus of the fifth embodiment, the receiving comprises receiving via dedicated signaling.

In the apparatus of the fifth embodiment, the method may also include applying narrow-band Internet-of-Things communication for the access to the network.

According to a sixth embodiment, a computer program product may be embodied on a non-transitory computer readable medium. The computer program product may be configured to control a processor to perform a method according to the fourth embodiment.

According to a seventh embodiment, an apparatus may include determining means for determining at least one access control criterion for a communication device. Meeting the at least one access control criterion depends on actions of the communication device. The apparatus may also include transmitting means for transmitting the at least one access control criterion to the communication device. The at least one access control criterion enables the communication device to determine whether the communication device is allowed to access a network.

According to an eighth embodiment, an apparatus may include receiving means for receiving at least one access control criterion from a network node of a network. The apparatus may also include first determining means for determining a need to access the network. The apparatus may also include second determining means for determining whether the communication device is allowed to access the network based on whether the received at least one access control criterion is met or not. Meeting the at least one access control criterion depends on actions of the communication device.

BRIEF DESCRIPTION OF THE DRAWINGS

For proper understanding of the invention, reference should be made to the accompanying drawings, wherein:

FIG. 1 illustrates an example Abstract Syntax Notation One (ASN.1), in accordance with certain embodiments.

DETAILED DESCRIPTION

Figure 2:
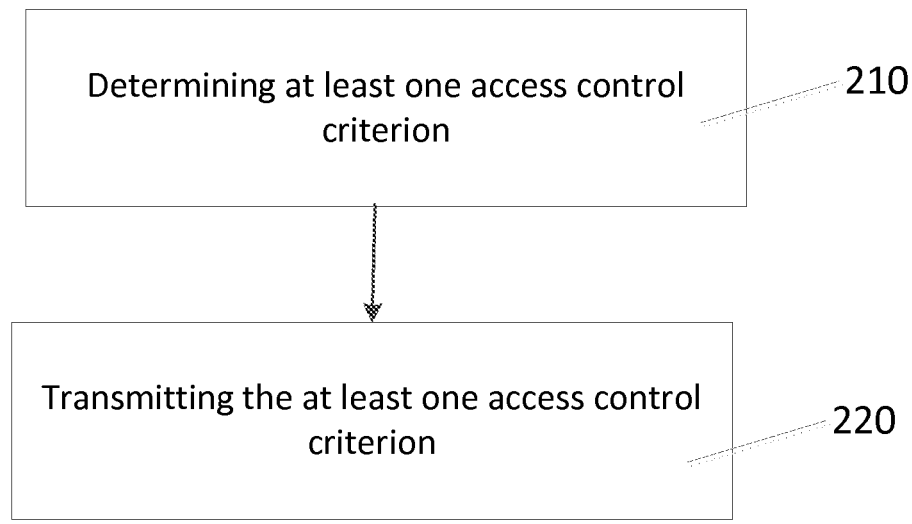
FIG. 2 illustrates a flowchart of a method in accordance with certain embodiments of the invention.

Certain embodiments of the present invention relate to implementing access control for, at least, communication devices that use narrowband Internet-of-Things (NB-IOT) technology. Although the description is written by using the NB-IOT as the access technology, the embodiments are applicable also for implementing access control for communication devices that use other technologies as well, such as Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. NB-IOT concept includes, for example, narrowband LTE, narrowband M2M, and narrowband OFDMA techniques.

Certain embodiments of the present invention may relate to a 3GPP work item entitled "Narrowband IOT". This 3 GPP work item states "[t]he objective of the work item is to specify a radio access for cellular internet of things, based to a great extent on a non-backward-compatible variant of E-UTRA, that addresses improved indoor coverage, support for massive number of low throughput devices, low delay sensitivity, ultra low device cost, low device power consumption and (optimised) network architecture."

The current access control methods/schemes are generally not suitable/sufficient for use with narrowband Internet-of-Things technology (NB-IOT). NB-IOT supports Multiple Coverage Enhancement (CE) levels. Also, with NB-IOT, user equipment (UE) that is in deep enhanced coverage may cause more load and interference, as compared to UEs in normal coverage. This larger amount of load and interference may result from a high amount of transmission repetitions performed by the UEs. The larger load/interference may also result from a high transmit power used by the UEs. With NB-IOT, the need to support multiple CE levels, along with the larger amount of potential load/interference, may cause the current access control methods/schemes to not be suitable/sufficient for use.

With regard to some examples of access control, 3GPP defines two Access control mechanisms as follows:

Access Class Barring (ACB), where the access barring is performed per access class stored in the Universal Subscriber Identity Module (USIM) of the UEs Extended Access class barring (EAB) is performed by UEs, which are subject to EAB. For example, EAB may be performed only by devices that are configured (via manufacturing, programming, USIM, etc.) to be EAB UE. Barring is performed per each category of UEs for which EAB applies. For example, value a corresponds to all UEs, value b corresponds to the UEs that are neither in their Home Public Land Mobile Network (HPLMN), nor in a PLMN that is equivalent to it, and value c corresponds to the UEs that are neither in the PLMN listed as most preferred PLMN of the country where the UEs are roaming in the operator-defined PLMN selector list on the USIM, nor in their HPLMN, nor in a PLMN that is equivalent to their HPLMN.

Certain embodiments of the present invention are directed to access control mechanisms for NB-IOT, where the network (NW) provides barring parameters to UE for the UE's consideration. The UE considers the received barring parameters to determine whether the UE may access the NW. The NW may provide barring parameters to the UE via broadcast and/or dedicated signalling.

Certain embodiments of the present invention may consider the following parameters/criteria when determining a barring status for the UE, where the barring status determines whether the UE is granted or denied an access to the NW. As described in more detail below, the NW (via an eNB, for example) may transmit the access barring/control parameters to the UE. As described above, with certain embodiments, the UE may consider the received parameters/criteria to determine whether the UE is allowed to access the network.

With certain embodiments, the access to the NW may be granted or denied based upon whether normal reporting and/or exception reporting is being performed by the UE. With certain embodiments, the NW may transmit an access barring parameter to the UE which indicates that only UE that performs exception reporting is allowed access to the NW. The NW may be able to bar normal reporting or exception reporting. The NW may also be able to bar both types of reporting. The NW may transmit an access barring parameter that bars UEs which perform normal reporting and/or exception reporting.

With regard to exception reporting, many sensor type applications may be expected to monitor a physical condition and to trigger an exception report when an event is detected. Such events are expected to be generally rare, typically occurring every few months or even years. Examples of such applications include smoke alarm detectors, power failure notifications from smart meters, and tamper notifications. In an embodiment, the exception reporting comprises high priority data.

With regard to normal reporting, normal periodic uplink reporting is expected to be common for cellular IoT applications such as applications related to smart utility (gas/water/electric) metering reports, smart agriculture, and/or smart environment, for example. In an embodiment, the normal reporting comprises normal and/or low priority data.

With certain embodiments, the access may be based upon a coverage enhancement level. For example, the NW may transmit an access barring parameter that bars UEs which are in specific coverage area(s). The NW may transmit an accessing barring parameter that indicates which coverage areas are barred. For example, the NW may indicate an explicit CE level that is barred. The NW may bar any or all of a normal coverage, an extended coverage, a shallow extended coverage, and/or a deep extended coverage. In one embodiment, the NW may signal to the UE the coverage area class under which the UE currently is. In one embodiment, the UE may determine the coverage area level based on the radio measurements. The NW may provide thresholds/criteria for each coverage area to the UE.

In some embodiments, the access may be dependent on at least one coverage class which is allowed or not allowed to access the network. Thus, only devices with an allowed/authorized coverage class may be allowed or may not be allowed to access the network. "Coverage area class" typically means the device's capability to operate in certain coverage extension(s), whereas "Coverage area" typically means the location where the device is physically located in the cell.

With certain embodiments, the access may be based upon radio power and/or quality-level thresholds. The NW may transmit an access barring parameter that corresponds to radio power/quality level thresholds that are to be met (by UE) in order to access the network. The UE may measure the received power level/signal quality based on normal radio measurements, such as based on a reference signal receive power (RSRP) or a received signal strength indicator (RSSI). With certain embodiments, if a UE does not have sufficient radio power, or a sufficient quality level, then the UE may be barred from access. In one embodiment, the UE may use the measured received signal power/quality level, such as RSRP and/or RSSI, for determining the coverage area class/level the UE currently is located.

Barring, or access control in general, may typically be performed in load situations, and devices in bad coverage will cause more load because of bad radio conditions and needed transmission repetitions. Thus, it may provide benefits if these devices can be barred in load situation. On the other hand, there could be different kinds of devices with different kind of services and it may be good not to bar certain devices even in bad NW coverage. Owing to the embodiments of the invention, these aspects can be taken into account and the barring mechanism becomes more flexible.

With certain embodiments, whether to access or not may be based upon a time at which reporting was last performed successfully or unsuccessfully (when performing normal or exception reporting, for example). With certain embodiments, the NW may bar the devices that were recently able to perform reporting. With certain embodiments, the NW may control how often the devices can try to perform reporting again. The NW may transmit access barring parameters that reflect the above barring conditions.

With certain embodiments, barring may also be determined based on a subscription class. For example, a gold user may be allowed to access the network, but a bronze user may not be allowed to access the network.

Certain embodiments may define that the access is allowed with certain type of devices. For example, sensors devices may be allowed to send measured sensor data, whereas other type of devices may not be allowed to access the network.

Certain embodiments may work together with typical barring mechanisms. For example, the eNB could still bar, for example, a certain percentage of UEs (such as, for example, 30% of UEs) at a certain coverage level.

Further, certain embodiments may also use the following information/criteria to determine a barring status of a cell. The NW may perform barring of UE based upon which Public Land Mobile Network (PLMN) corresponds to the UE. For example, the NW may bar UE which correspond to any of 6 PLMNs, for example. Certain embodiments may perform barring according to Access class (as stored on the Universal Subscriber Identity Module (USIM) of the UE). The Access classes may range from 0 to 15.

Further, certain embodiments may determine whether a UE is allowed to access the NW, based on whether the UE is roaming. Certain embodiments may differentiate between roaming and non-roaming UEs. The NW may transmit access barring parameters that grant or deny access to roaming UE. Certain embodiments may differentiate between roaming UEs in the most preferred PLMN and other roaming UEs. For example, the NW may grant access to UEs in the most preferred PLMN.

Certain embodiments of the present invention may use any combination of the above. For example, certain embodiments may bar UE in a specific PLMN, may bar UE of an access class Y, or may allow a roaming user to only send exception data in case a CE level is X, for example.

Certain embodiments may reduce interference in only certain regions. For example, an evolved Node B (eNB) may bar normal coverage UEs in cases where the eNB wants more resources for extended coverage UEs.

FIG. 1 illustrates an example Abstract Syntax Notation One (ASN.1), in accordance with certain embodiments. The ASN.1 may describe rules and structures for representing, encoding, transmitting, and decoding data in telecommunications and computer networking.

Certain embodiments may provide flexible access control with one or more access control mechanisms. Certain embodiments may have the ability to handle roaming UEs. Certain embodiments may also have the ability to handle different subscriptions differently.

FIG. 2 illustrates a flowchart of a method in accordance with certain embodiments of the invention. The method illustrated in FIG. 2 includes, at 210, determining, by a network node of a network, at least one access control criterion for a communication device. Meeting the at least one access control criterion depends on actions of the communication device. The method may also include, at 220, transmitting the at least one access control criterion to the communication device. The at least one access control criterion enables the communication device to determine whether the communication device is allowed to access a network.

Access control criteria/parameters may be seen to comprise either access granting criteria/parameters and/or access barring criteria/parameters. The criteria/parameters may be indicated in a positive manner (e.g., indicating when the access is allowed) and/or in a negative manner (e.g., indicating when the access is not allowed, such as, under poor coverage, access is not allowed).

The proposed criteria may be dynamic in nature such that whether the communication device is allowed to access the network or not may depend on recent actions of the communication device. For example, the device may be allowed to access the network if the UE has not sent any data to the network in a predetermined period of time. For example, the device may be barred from access if the UE has moved to an unauthorized/unaccepted coverage area or coverage class. For example, if the device is about to initiate the access to the network on the basis of a need to perform exception reporting, such as high priority data (e.g., the device has detected an exception and needs to send an alarm), the access may be allowed. Thus, in one embodiment, the proposed criteria depend on the actions of the device. Therefore, they may be seen as dynamic in nature—at some point, the device may access the network whereas, at another point, it cannot, regardless of the fact that the criteria itself may have remained the same. On the other hand, the criteria may be dynamic as well, as the NW may configure the device with updated criteria whenever needed.

In an embodiment, the at least one criterion comprises a criterion/parameter related to narrowband Internet-of-things communication.

Figure 3:
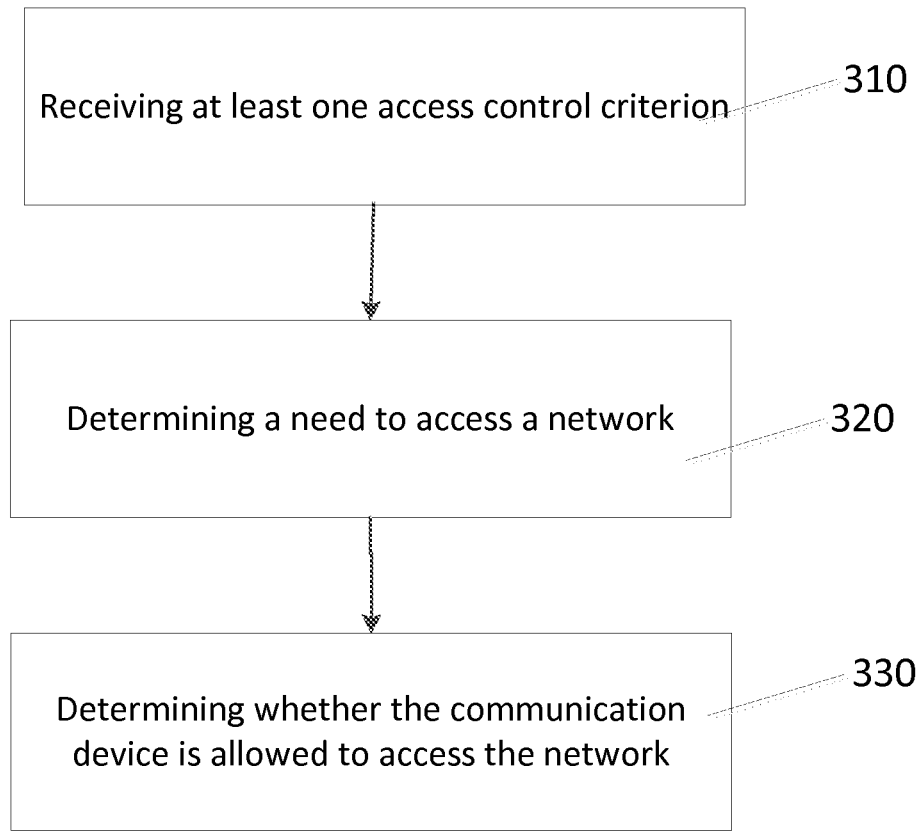
FIG. 3 illustrates a flowchart of a method in accordance with certain embodiments of the invention.

FIG. 3 illustrates a flowchart of a method in accordance with certain embodiments of the invention. The method illustrated in FIG. 3 includes, at 310, receiving, by a communication device, at least one access control criterion from a network node of a network. The method may also include, at 320, determining a need to access the network. The method may also include, at 330, determining whether the communication device is allowed to access the network based on whether the received at least one access control criterion is met or not. Meeting the at least one access control criterion depends on actions of the communication device.

Figure 4:
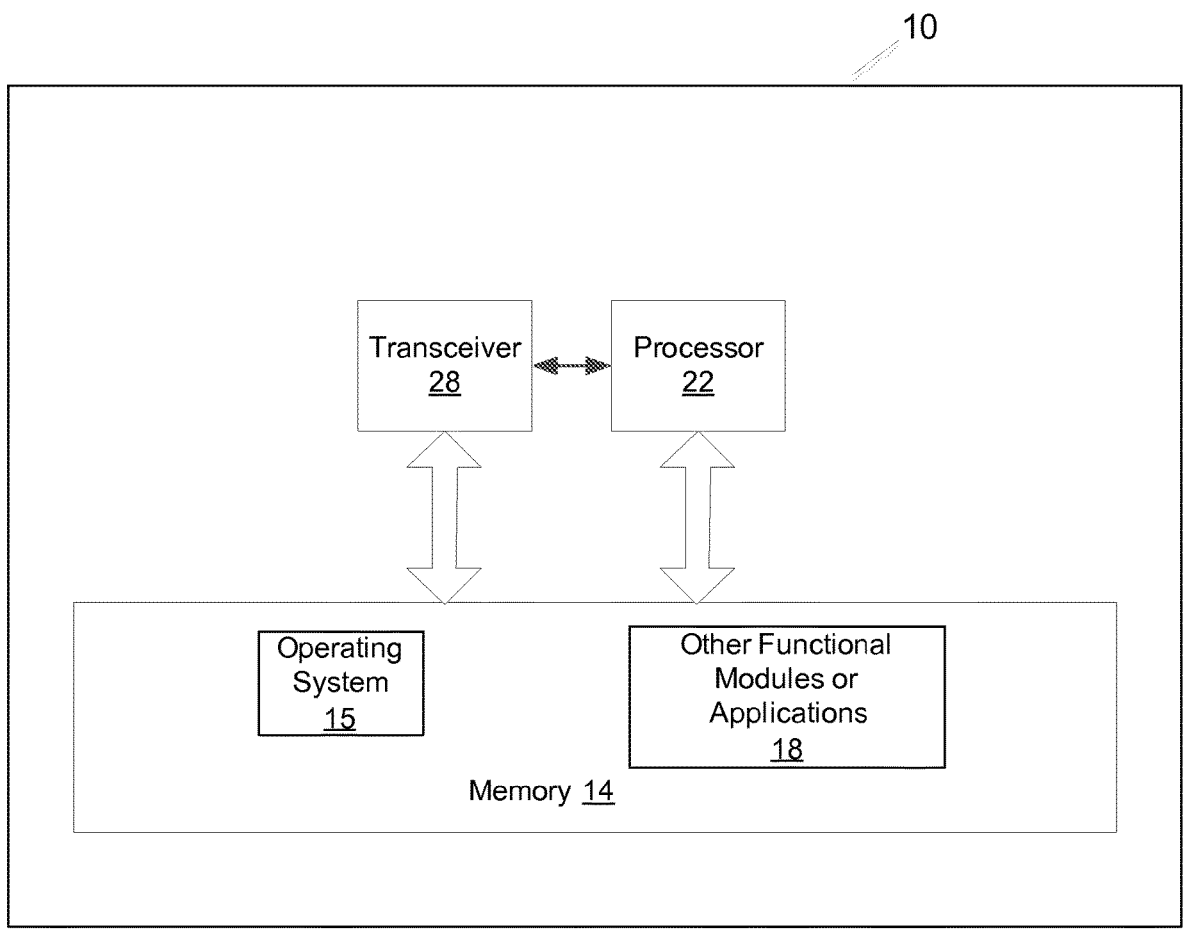
FIG. 4 illustrates an apparatus in accordance with certain embodiments of the invention.

FIG. 4 illustrates an apparatus in accordance with certain embodiments of the invention. In one embodiment, the apparatus can be a base station and/or an evolved Node B, for example. In another embodiment, the apparatus may be a UE, for example. The apparatus may be configured to perform, at least, the methods described in FIG. 2 and/or FIG. 3. Apparatus 10 can include a processor 22 for processing information and executing instructions or operations. Processor 22 can be any type of general or specific purpose processor. While a single processor 22 is shown in FIG. 4, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 5:
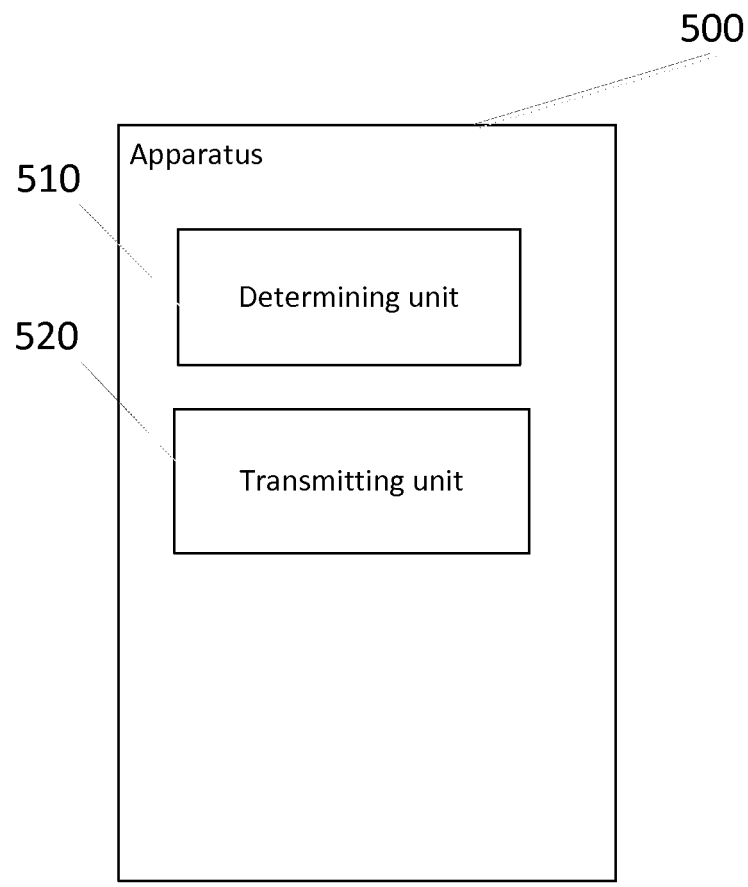
FIG. 5 illustrates an apparatus in accordance with certain embodiments of the invention.

FIG. 5 illustrates an apparatus in accordance with certain embodiments of the invention. Apparatus 500 can be a network node such as a base station and/or an eNB, for example. In an embodiment, the apparatus 500 may comprise a remote control unit operatively coupled (e.g., via a wireless or wired network) to a remote radio head (RRH) located on the base station. In an embodiment, at least some of the described processes may be performed by the remote control unit. In an embodiment, the execution of the processes may be shared among the RRH and the apparatus 500 locating in the remote control unit, which may also be referred to as a central unit or "cloud".

Apparatus 500 can include a determining unit 510 that determines at least one access control criterion for a communication device. Meeting the at least one access control criterion depends on actions of the communication device. Apparatus 500 can also include a transmitting unit 520 that transmits the at least one access control criterion to the communication device. The at least one access control criterion enables the communication device to determine whether the communication device is allowed to access a network.

Figure 6:
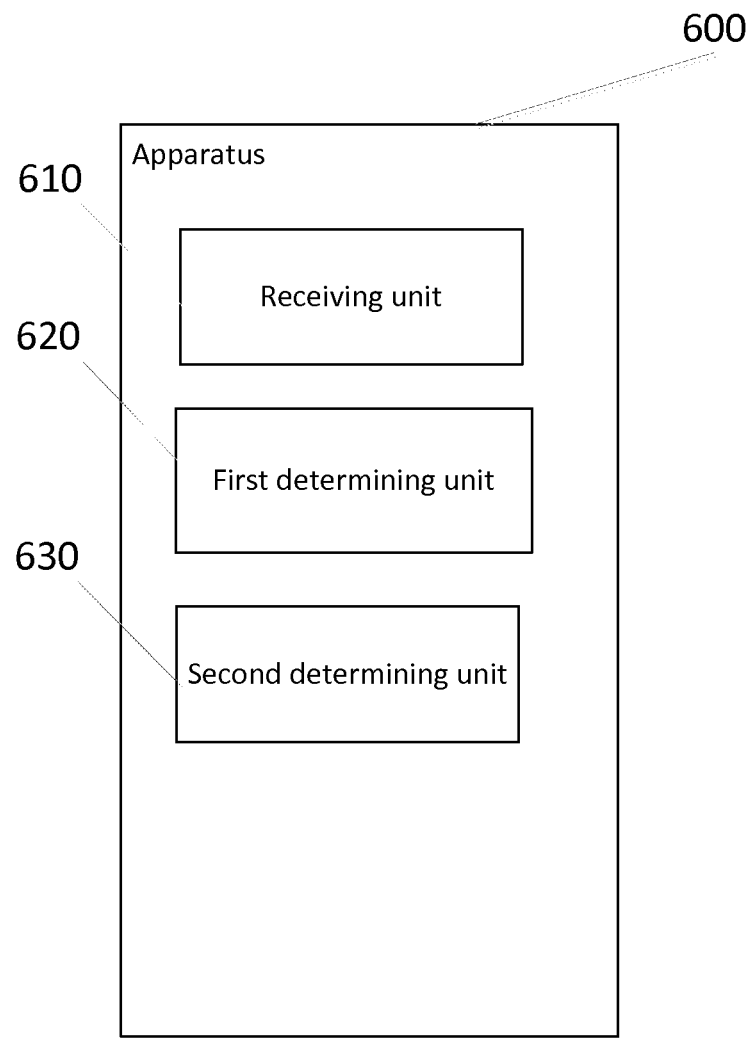
FIG. 6 illustrates an apparatus in accordance with certain embodiments of the invention.

FIG. 6 illustrates an apparatus in accordance with certain embodiments of the invention. Apparatus 600 can be a user equipment, for example. The apparatus 600 may comprise the terminal device of a cellular communication system, e.g. a user equipment (UE), a user terminal (UT), a computer (PC), a laptop, a tabloid computer, a cellular phone, a mobile phone, a communicator, a smart phone, a palm computer, or any other communication apparatus. Alternatively, the apparatus 600 is comprised in such a terminal device. Further, the apparatus 600 may be or comprise a module (to be attached to the UE) providing connectivity, such as a plug-in unit, an "USB dongle", or any other kind of unit. The unit may be installed either inside the UE or attached to the UE with a connector or even wirelessly.

Apparatus 600 can include a receiving unit 610 that receives at least one access control criterion from a network node of a network. Apparatus 600 may also include a first determining unit 620 that determines a need to access the network. Apparatus 600 may also include a second determining unit 630 that determines whether the communication device is allowed to access the network based on whether the received at least one access control criterion is met or not. Meeting the at least one access control criterion depends on actions of the communication device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    receiving, by a communication device via broadcast signaling, at least one access control criterion from a network access node of a network, wherein the at least one access control criterion indicates a received power threshold that is to be met in order to access the network;
    determining a need to access the network;
    determining a barring status for the communication device based on whether the received at least one access control criterion is met or not;
    determining, based on the determined barring status, whether the communication device is allowed to access the network via the network access node; and
    upon determining that the communication device is allowed to access the network via the network access node, accessing the network via the network access node.

2. The method according to claim 1, wherein the receiving comprises receiving by a user equipment from an evolved Node B.

3. The method according to claim 1, wherein the at least one access control criterion indicates a type of reporting that can access the network.

4. The method according to claim 3, wherein the type of reporting that can access the network comprises only exception reporting.

5. The method according to claim 4, wherein the exception reporting comprises high priority data.

6. The method according to claim 3, wherein the type of reporting that can access the network comprises normal reporting.

7. The method according to claim 1, wherein the at least one access control criterion indicates at least one coverage class which is allowed or not allowed to access the network.

8. The method according to claim 1, wherein the at least one access control criterion indicates a received signal quality level that is to be met in order to access the network.

9. The method according to claim 1, wherein the at least one access control criterion indicates a time that is required to have elapsed since a last reporting by the communication device in order to access the network.

10. The method according to claim 1, wherein the at least one access control criterion further indicates a subscription class that is required from a user subscription in order to access the network.

11. The method according to claim 1, further comprising:
    receiving a plurality of the access control criteria from the network access node, wherein the deciding of whether or not to initiate access to the network comprises considering all of the plurality of received access control criteria.

12. The method according to claim 1, wherein the receiving comprises receiving via dedicated signaling.

13. The method according to claim 1, further comprising:
    applying narrow-band Internet-of-Things communication for the access to the network.

14. An apparatus, comprising:
    at least one processor; and
    at least one memory storing computer program code,
    the at least one memory and the computer program code being configured, with the at least one processor, to cause the apparatus at least to:
    receive, via broadcast signaling, at least one access control criterion from a network access node of a network, wherein the at least one access control criterion indicates a received power threshold that is to be met in order to access the network;
    determine a need to access the network;
    determine a barring status for the apparatus based on whether the received at least one access control criterion is met or not;
    determine, based on the determined barring status, whether the apparatus is allowed to access the network via the network access node; and
    upon determining that the apparatus is allowed to access the network via the network access node, access the network via the network access node.

15. The apparatus according to claim 14, wherein the at least one access control criterion indicates at least one of: a type of reporting that can access the network, at least one coverage class which is allowed or not allowed to access the network, a received signal quality level that is to be met in order to access the network, a time that is required to have elapsed since last reporting by the apparatus in order to access the network, and a subscription class that is required from a user subscription in order to access the network.

16. The apparatus according to claim 14, wherein the at least one memory and the computer program code are configured, with the at least one processor, to further cause the apparatus at least to:
    apply narrow-band Internet-of-Things communication for the access to the network.

17. An apparatus, comprising:
    at least one processor; and
    at least one memory storing computer program code,
    the at least one memory and the computer program code being configured, with the at least one processor, to cause the apparatus at least to:
    determine at least one access control criterion for a communication device, wherein the at least one access control criterion indicates a received power threshold that is to be met in order to access the network; and
    transmit, via broadcast signaling, the at least one access control criterion to the communication device, wherein the at least one access control criterion enables the communication device to determine a barring status for the communication device based on whether the at least one access control criterion is met or not.

18. The apparatus according to claim 17, wherein the at least one access control criterion indicates at least one of: a type of reporting that can access the network, at least one coverage class which is allowed or not allowed to access the network, a received signal quality level that is to be met in order to access the network, a time that is required to have elapsed since last reporting by the communication device in order to access the network, and a subscription class that is required from a user subscription in order to access the network.

* * * * *